United States Patent
Mader et al.

[11] Patent Number: 5,380,018
[45] Date of Patent: Jan. 10, 1995

[54] PISTON RING HAVING A NON-UNIFORM RADIAL PRESSURE DISTRIBUTION

[75] Inventors: Heinrich-Christian Mader, Bursheid; Albin Mierbach; Wolfgang Schmelter, both of Leverkusen, all of Germany

[73] Assignee: Goetze AG, Burscheid, Germany

[21] Appl. No.: 985,907

[22] Filed: Dec. 4, 1992

[30] Foreign Application Priority Data

Dec. 6, 1991 [DE] Germany .................. 4140232

[51] Int. Cl.⁶ .................................... F16J 15/32
[52] U.S. Cl. ............................. 277/216; 277/138
[58] Field of Search .......... 277/216, 217, 26, 138, 277/236

[56] References Cited

U.S. PATENT DOCUMENTS

| | | | |
|---|---|---|---|
| 1,321,539 | 11/1919 | Mummert | 277/217 |
| 1,406,475 | 2/1922 | Morgal | 277/217 |
| 1,654,736 | 1/1928 | Kistner | 277/217 |

FOREIGN PATENT DOCUMENTS

| | | | |
|---|---|---|---|
| 0142920 | 5/1920 | United Kingdom | 277/217 |
| 0589003 | 6/1947 | United Kingdom | 277/216 |

OTHER PUBLICATIONS

Mierbach et al., "Heat Flow Through Piston Rings and Its Influence on Shape", SAE Technical Papers Series, 831283, Sep. 12–15, 1983, pp. 25–37.

Primary Examiner—William A. Cuchlinski, Jr.
Assistant Examiner—Daniel G. DePumpo
Attorney, Agent, or Firm—Spencer, Frank & Schneider

[57] ABSTRACT

A piston ring has a gap defined by ring gap faces oriented toward one another and a nominal outer radius assumed by the piston ring in a closed position in which the piston ring is in an installed state in an engine cylinder having a radius equalling the nominal outer radius of the piston ring. The piston ring has first length portions extending from both ring gap faces and having a central angle of at least 15° and less than 25° and second length portions immediately adjoining each respective first length portion and having a central angle of approximately 10°. In the installed state the first length portions have a radius of curvature equalling the nominal outer radius and the radius of curvature of the second length portions is smaller than the nominal outer radius. By virtue of such a ring configuration, a radial pressure distribution of the piston ring in the installed state is substantially zero at the ring gap and increases in opposite directions from the ring gap to a maximum value in the second length portions. The maximum value is in excess of 200% of an average circumferential radial pressure distribution of the piston ring in the installed state.

13 Claims, 1 Drawing Sheet

PISTON RING HAVING A NON-UNIFORM RADIAL PRESSURE DISTRIBUTION

CROSS REFERENCE TO RELATED APPLICATION

This application claims the priority of German Application No. P 41 40 232.4, filed Dec. 6, 1991, which is incorporated herein by reference.

BACKGROUND OF THE INVENTION

This invention relates to a self-tensioning piston ring which, in the closed (circumferentially compressed) state, has a non-uniform, radially outwardly oriented pressure distribution.

In piston rings, apart from the shape of the cross section and the running face of the piston ring as well as the properties of the ring material, the radial pressure distribution has also a decisive effect on the favorable wear conditions, particularly of the running face of the piston ring. High performance piston rings essentially have-viewed about the circumference of the ring-a non-uniform radial pressure distribution; the manufacturers of piston rings seek a pressure distribution which corresponds either to a so-called four-stroke contact characteristic or a two-stroke contact characteristic.

In piston rings having a four-stroke contact characteristic, the radial pressure is higher at the ring gap zone (that is, along a ring length portion on either side of the ring gap) to thus generate a restraining force at the gap to reduce the full effect of ring flutter at the gap.

Piston rings having a two-stroke contact characteristic have in the ring gap zone a radial pressure which is reduced relative to piston rings of four-stroke contact characteristic. The higher radial pressure is relocated into the quadrants separated by the gap. Such piston rings are discussed in an article by A. Mierbach et al, entitled "Heat Flow Through Piston Rings and its Influence on Shape" published by the Society of Automotive Engineers, Inc. in the SAE Technical Paper Series No. 831283, September 1983. This article discloses that a significant portion of the heat flows from the piston to the cylinder across the piston rings. As a result, the piston ring is, at the inner diameter, hotter than at the outer diameter where the ring contacts the cylinder wall. This fact affects the sealing behavior of the piston ring both during engine start (cold engine) and during operation (warm engine).

In the cold state, a piston ring of four-stroke contact characteristic engages the cylinder wall with a clearance in a light-tight manner. During operation (warm engine), the radius of curvature of the piston ring increases compared to the cold condition, because, due to the higher temperatures, at the inner diameter the ring expands to a greater extent and thus stretches more than at its outer surface. Such a change in the radius of curvature leads at the gap zones to a non-sealing contact characterized by forces concentrated in points. The piston ring which is then no longer light-tight is exposed to excessive running face wear at the gap zones and has a high oil consumption during the break-in period.

A piston ring having a two-stroke contact characteristic behaves precisely in an opposite manner compared to a piston ring of four-stroke contact characteristic. In the cold condition the ring engages the cylinder wall at the gap zones in a manner which is not light-tight, whereby cold starting problems arise. By virtue of the thermal expansion, the gap zone of the piston ring engages the cylinder wall only during the operational phase (warm engine).

SUMMARY OF THE INVENTION

It is an object of the invention to provide an improved piston ring of the above-outlined type which, whether of the two-stroke or four-stroke contact characteristic, engages the cylinder wall in a light-tight manner both in the cold-engine and hot-engine condition.

This object and others to become apparent as the specification progresses, are accomplished by the invention, according to which, briefly stated, the piston ring has a gap defined by ring gap faces oriented toward one another and a nominal outer radius assumed by the piston ring in a closed position in which the piston ring is in an installed state in an engine cylinder having a radius equalling the nominal outer radius of the piston ring. The piston ring has first length portions extending from both ring gap faces and having a central angle of at least 15° and less than 25° and a second length portions immediately adjoining each respective first length portion and having a central angle of approximately 10°. In the non-installed state the first length portions have a radius of curvature equalling the nominal outer radius and the radius of curvature of the second length portions is smaller than the nominal outer radius. By virtue of such a ring configuration, a radial pressure distribution of the piston ring in the installed state is substantially zero at the ring gap and increases in opposite directions from the ring gap to a maximum value in the second length portions. The maximum value is in excess of 200% of an average circumferential radial pressure distribution of the piston ring in the installed state.

In a piston ring according to the invention as defined above, all circumferential points of the piston ring engage the cylinder wall in a light-tight manner even in the cold state. The increase in the radius of curvature in the hot condition is compensated for by the relatively high radial pressure on either side of the ring gap, that is, a lack of light-tightness as experienced in piston rings having four or two-stroke contact characteristics does not occur at any time so that the piston ring is sealing in an optimal manner under both cold and warm engine conditions.

DESCRIPTION OF THE PREFERRED EMBODIMENT

Figure 1:
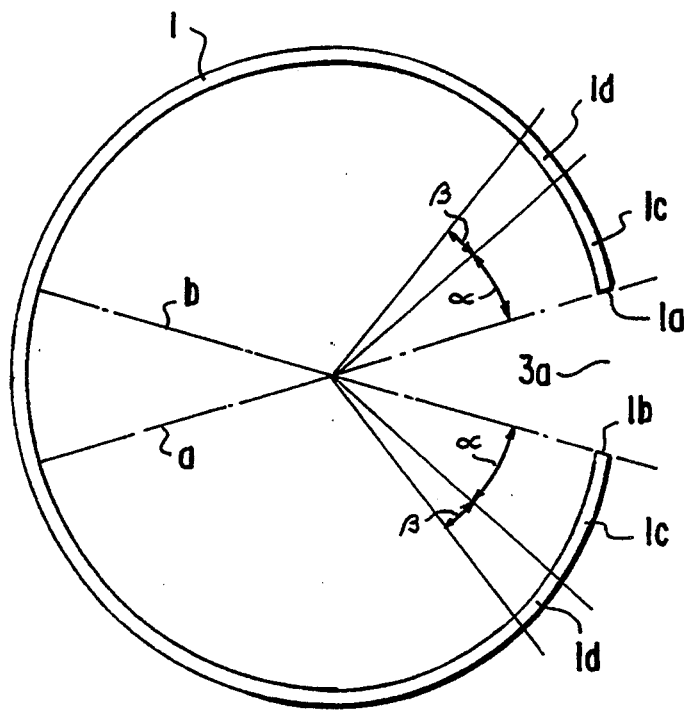
FIG. 1 is a top plan view of a piston ring according to the invention, shown in the free, non-installed state.

Turning to FIG. 1, the piston ring 1 structured according to the invention is shown in a free, unstressed, non-installed state. The ring is split and has ring faces 1a and 1b which together define a piston ring gap 3a in the free ring state. From the ring faces 1a and 1b first length portions 1c extend, whose length is expressed by a central angle $\alpha$ measured from a ring diameter a and b in which the respective gap faces 1a and 1b lie. Each first length portion 1c is adjoined by respective second length portions 1d having a central angle $\beta$.

According to the invention, in the free state of the piston ring as shown in FIG. 1, the radius of curvature of the ring length portions 1c wherein $\alpha$ is at least 15° and less than 25°, is equal to or not more than 2% smaller than the nominal outer radius of the piston ring. The nominal outer radius of the piston ring is the radius which the piston ring assumes in its closed, circumferentially compressed state when it is in the installed condition in the cylinder and thus corresponds to the cylinder radius. Further, in the free state of the piston ring the ring length portions 1d, wherein $\beta$ is approximately 10°, have a radius of curvature less than the radius of curvature of the length portions 1c. Beyond the length portions 1d the radius of curvature of the piston ring increases up to a ring zone which is diametrically opposite from the gap 3a.

By way of an example, the radius of curvature in the free state of the piston ring is, in the length portions 1c, 0–2% less than the nominal radius whereas in the ring length portions 1d the radius of curvature is 2% less than in the ring length portions 1c. From the end of the respective ring length portions 1d the radius of curvature increases and, at the ring zone generally diametrically opposite to the open ring gap 3a, attains a value which is about 10% greater than the radius of curvature of the ring length portions 1c.

Figure 2:
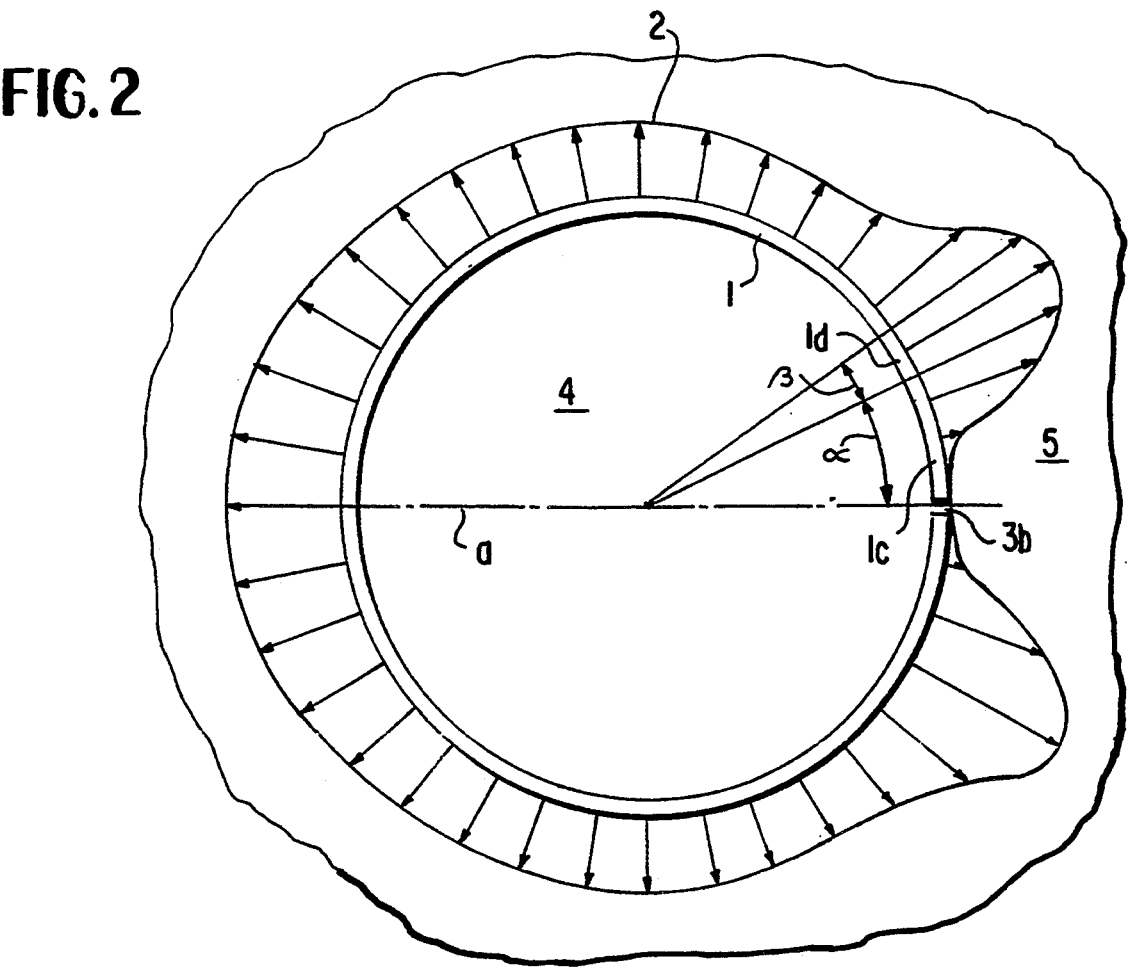
FIG. 2 is a top plan view of the piston ring of FIG. 1, shown in the closed, installed state.

Turning to FIG. 2, the piston ring 1 is shown in its closed state in which it is installed in the cylinder 4 of an engine block 5 and in which it has a ring gap 3b. It is noted that the piston which carries the piston ring 1 is not shown for the sake of clarity and the length portions 1c, 1d, as well as angles $\alpha$ and $\beta$ are shown only on the side of the gap face 1a.

The piston ring 1 positioned in the cylinder 4 exerts, by virtue of its compresed state, a radially outwardly oriented pressure on the cylinder wall along the circumference of the piston ring. The radial pressure distribution is indicated by a curve 2.

By virtue of the changes in relative magnitudes of the radii of curvature in particular in the piston zones as described in connection with FIG. 1, the outwardly oriented radial pressure is, as seen in FIG. 2, essentially zero at the ring gap 3b and it increases to a peak within the length portions 1d. The peak pressure value in the ring zones 1d on either side of the gap 3b is more than 200% of the average radial pressure. From the peak value in a direction away from the gap 3b the radial pressure varies gradually in a conventional manner.

By virtue of the radial pressure distribution according to the invention, both in the cold and the hot state of the engine a light-tight engagement with the cylinder wall throughout the entire piston ring circumference is achieved in rings having either two-stroke or four-stroke contact characteristics.

It will be understood that the above description of the present invention is susceptible to various modifications, changes and adaptations, and the same are intended to be comprehended within the meaning and range of equivalents of the appended claims.

What is claimed is:

1. In a piston ring having a gap defined by ring gap faces oriented toward one another and a nominal outer radius assumed by the piston ring in a closed position in which the piston ring is in an installed state in an engine cylinder having a radius equalling the nominal outer radius of the piston ring; the improvement wherein said piston ring has first length portions extending from both ring gap faces and having a central angle of at least 15° and less than 25° and second length portions immediately adjoining each respective first length portion and having a central angle of approximately 10°; in a free, non-installed state the first length portions having a radius of curvature equalling said nominal outer radius and the radius of curvature of the second length portions being less than the radius of curvature of the first length portions, whereby all circumferential points of the piston ring engage the cylinder light-tight and a radial pressure distribution of the piston ring in the installed state is substantially zero at the ring gap and increases in opposite directions from the ring gap to a maximum value in the second length portions; said maximum value being in excess of 200% of an average circumferential radial pressure distribution of the piston ring in the installed state.

2. The piston ring as defined in claim 1, wherein in the free state of the piston ring the radius of curvature of the second length portions is about 2% less than the radius of curvature of the first length portions.

3. The piston ring as defined in claim 2, wherein the radius of curvature of the piston ring increases from each second length portion toward a piston ring location being generally diametrically opposite said ring gap.

4. The piston ring as defined in claim 2, wherein the radius of curvature of the piston ring increases from each second length portion toward a piston ring location being generally diametrically opposite said ring gap to a value being about 10% greater than the radius of curvature of the first length portions.

5. In a piston ring having a gap defined by ring gap faces oriented toward one another and a nominal outer radius assumed by the piston ring in a closed position in which the piston ring is in an installed state in an engine cylinder having a radius equalling the nominal outer radius of the piston ring; the improvement wherein said piston ring has first length portions extending from both ring gap faces and having a central angle of at least 15° and less than 25° and second length portions immediately adjoining each respective first length portion and having a central angle of approximately 10°; in a free, non-installed state the first length portions having a radius of curvature being 0–2% less than said nominal outer radius and the radius of curvature of the second length portions being less than the radius of curvature of the first length portions, whereby all circumferential points of the piston ring engage the cylinder light-tight and a radial pressure distribution of the piston ring in the installed state is substantially zero at the ring gap and increases in opposite directions from the ring gap to a maximum value in the second length portions; said maximum value being in excess of 200% of an average circumferential radial pressure distribution of the piston ring in the installed state.

6. The piston ring as defined in claim 5, wherein the radius of curvature of the second length portions is about 2% less than the radius of curvature of the first length portions.

7. The piston ring as defined in claim 6, wherein the radius of curvature of the piston ring increases from each second length portion toward a piston ring location being generally diametrically opposite said ring gap.

8. The piston ring as defined in claim 6, wherein the radius of curvature of the piston ring increases from each second length portion toward a piston ring location being generally diametrically opposite said ring gap to a value being about 10% greater than the radius of curvature of the first length portions.

9. In a piston ring and engine cylinder assembly, the cylinder including a cylinder wall having a radius; the piston ring having a gap defined by ring gap faces oriented to one another; the piston ring further having a free, non-installed state and a compressed, installed state in which it is received in the cylinder; in the installed state the piston ring having an outer radius equalling the cylinder radius; the improvement wherein said piston ring has first length portions extending from both ring gap faces and having a central angle of at least 15° and less than 25° and second length portions immediately adjoining each respective first length portion and having a central angle of approximately 10°; in the free, non-installed state the first length portions having a radius of curvature equalling the cylinder radius and the radius of curvature of the second length portions being less than the radius of curvature of the first length portions, whereby in the installed state all circumferential points of the piston ring engage the cylinder light-tight and a radial pressure distribution of the piston ring is substantially zero at the ring gap and increases in opposite directions from the ring gap to a maximum value in the second length portions; said maximum value being in excess of 200% of an average circumferential radial pressure distribution of the piston ring in the installed state.

10. In a piston ring and engine cylinder assembly, the cylinder including a cylinder wall having a radius; the piston ring having a gap defined by ring gap faces oriented to one another; the piston ring further having a free, non-installed state and a compressed, installed state in which it is received in the cylinder; in the installed state the piston ring having an outer radius equalling the cylinder radius; the improvement wherein said piston ring has first length portions extending from both ring gap faces and having a central angle of at least 15° and less than 25° and second length portions immediately adjoining each respective first length portion and having a central angle of approximately 10°; in the free, non-installed state the first length portions having a radius of curvature being 0-2% less than the cylinder radius and the radius of curvature of the second length portions being less than the radius of curvature of the first length portions, whereby in the installed state all circumferential points of the piston ring engage the cylinder light-tight and a radial pressure distribution of the piston ring is substantially zero at the ring gap and increases in opposite directions from the ring gap to a maximum value in the second length portions; said maximum value being in excess of 200% of an average circumferential radial pressure distribution of the piston ring in the installed state.

11. The piston ring as defined in claim 10, wherein in the free state of the piston ring the radius of curvature of the second length portions is about 2% less than the radius of curvature of the first length portions.

12. The piston ring as defined in claim 11, wherein the radius of curvature of the piston ring increases from each second length portion toward a piston ring location being generally diametrically opposite said ring gap.

13. The piston ring as defined in claim 11, wherein the radius of curvature of the piston ring increases from each second length portion toward a piston ring location being generally diametrically opposite said ring gap to a value being about 10% greater than the radius of curvature of the first length portions.

* * * * *